United States Patent
Kunz et al.

(10) Patent No.: US 11,665,569 B2
(45) Date of Patent: *May 30, 2023

(54) REPORTING MONITORED PARAMETER INFORMATION (71) Applicant: Motorola Mobility LLC, Chicago, IL (US)

(72) Inventors: Andreas Kunz, Ladenburg (DE); Prateek Basu Mallick, Dreieich (DE); Joachim Loehr, Wiesbaden (DE); Genadi Velev, Darmstadt (DE); Ravi Kuchibhotla, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/205,994

(22) Filed: Mar. 18, 2021

(65) Prior Publication Data

US 2021/0211917 A1 Jul. 8, 2021

Related U.S. Application Data (63) Continuation of application No. 16/010,912, filed on Jun. 18, 2018, now Pat. No. 10,986,519.

(Continued)

(51) Int. Cl.
*H04W 24/10* (2009.01)
*H04W 48/20* (2009.01)
(Continued)

(52) U.S. Cl.
CPC ......... *H04W 24/10* (2013.01); *H04W 12/122* (2021.01); *H04W 36/08* (2013.01); *H04W 48/20* (2013.01)

(58) Field of Classification Search
CPC . H04W 76/18; H04W 60/06; H04W 36/0079; H04W 12/12–128
See application file for complete search history.

(56) References Cited

U.S. PATENT DOCUMENTS

2013/0217382 A1 8/2013 Kudo
2016/0095030 A1* 3/2016 Lindoff ................. H04W 36/30
370/332
(Continued)

FOREIGN PATENT DOCUMENTS

EP 2003818 A1 12/2008
EP 2804416 A1 11/2014
(Continued)

OTHER PUBLICATIONS

PCT/US2018/038043, "Notification of Transmittal of the International Search Report and the Written Opinion of the International Searching Authority, or the Declaration" International Searching Authority, dated Sep. 26, 2018, pp. 1-13.

(Continued)

*Primary Examiner* — Marcus Smith
(74) *Attorney, Agent, or Firm* — Kunzler Bean & Adamson (57) ABSTRACT

Apparatuses, methods, and systems are disclosed for reporting monitored parameter information. One method includes receiving an indication to monitor parameters in an idle mode. The method includes monitoring the parameters in the idle mode. The method includes transmitting a request to a first base station. The method includes, in response to not receiving a correct response from the first base station: performing a cell reselection resulting in selection of a second base station; and transmitting a failure report to the second base station. The failure report includes information corresponding to the parameters monitored in the idle mode.

20 Claims, 7 Drawing Sheets

Related U.S. Application Data (60) Provisional application No. 62/521,266, filed on Jun. 16, 2017.

(51) Int. Cl.
*H04W 12/122* (2021.01)
*H04W 36/08* (2009.01)

(56) References Cited

U.S. PATENT DOCUMENTS

| | | |
|---|---|---|
| 2016/0249235 A1 | 8/2016 | Li et al. |
| 2016/0255674 A1 | 9/2016 | Niemi et al. |
| 2016/0270143 A1 | 9/2016 | Tachikawa |
| 2016/0309332 A1 | 10/2016 | Norrman et al. |
| 2016/0381545 A1 | 12/2016 | Wang et al. |
| 2017/0026859 A1 | 1/2017 | Ahmadzadeh et al. |
| 2017/0126411 A1* | 5/2017 | Piqueras Jover ..... H04W 12/04 |
| 2017/0127286 A1 | 5/2017 | Poznanski |
| 2017/0215132 A1 | 7/2017 | Moisanen et al. |
| 2018/0205749 A1* | 7/2018 | Nandha Premnath ...................... H04W 12/122 |
| 2018/0309769 A1* | 10/2018 | Snider ................. H04W 12/108 |
| 2018/0351975 A1 | 12/2018 | Briggs et al. |
| 2019/0045423 A1 | 2/2019 | Kumar et al. |
| 2019/0110205 A1 | 4/2019 | Shaik et al. |
| 2019/0349765 A1 | 11/2019 | Kolekar et al. |

FOREIGN PATENT DOCUMENTS

| | | |
|---|---|---|
| WO | 2008097044 A1 | 8/2008 |
| WO | 2016206610 A1 | 12/2016 |

OTHER PUBLICATIONS

"3rd Generation Partnership Project; Technical Specification Group Services and System Aspects; Study on the security aspects of the next generation system", 3GPP TR 33.899 V1.0.0 (Mar. 2017), pp. 1-471.

Deutsche Telekom, Vodafone, "CR to Correct UE Messages to be Sent Only After Security Activation", 3GPP TSG-RAN2 Meeting #92, R2-157177, Nov. 16-20, 2015, pp. 1-10.

SA3, "LS on Support for fake gNB detection mechanisms", 3GPP TSG-SA WG3 Meeting #87 S3-171568, May 15-19, 2017, pp. 1-2.

"3rd Generation Partnership Project; Technical Specification Group Services and System Aspects; 3GPP System Architecture Evolution (SAE); Security architecture (Release 14)", 3GPP TS 33.401 V14.1.0, Dec. 2016, pp. 1-152.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.7.0, Sep. 2015, pp. 1-391.

* cited by examiner

REPORTING MONITORED PARAMETER INFORMATION

CROSS-REFERENCE TO RELATED APPLICATIONS

This application is a continuation of patent application Ser. No. 16/010,912 entitled "REPORTING MONITORED PARAMETER INFORMATION" filed on Jun. 18, 2018, which claims priority to U.S. Patent Application Ser. No. 62/521,266 entitled "REPORTING OF ROGUE BASE STATION DETECTION" and filed on Jun. 16, 2017 for Andreas Kunz which is incorporated herein by reference in its entirety.

FIELD

The subject matter disclosed herein relates generally to wireless communications and more particularly relates to reporting monitored parameter information.

BACKGROUND

The following abbreviations are herewith defined, at least some of which are referred to within the following description: Third Generation Partnership Project ("3GPP"), Fifth Generation ("5G"), Authentication Authorization and Accounting ("AAA"), Positive-Acknowledgment ("ACK"), Acknowledged Mode ("AM"), Access and Mobility Management Function ("AMF"), Access Server ("AS"), Access Point ("AP"), Authentication Center ("AuC"), Authentication Server Function ("AUSF"), Authentication Token ("AUTN"), Base Station ("BS"), Bandwidth ("BW"), Cell Group ("CG"), Cipher Key ("CK"), Cell Radio Network Temporary Identifier ("C-RNTI"), Common Physical Downlink Control Channel ("C-PDCCH"), Dedicated Control Channel ("DCCH"), Downlink ("DL"), Demodulation Reference Signal ("DMRS"), Domain Name System ("DNS"), Enhanced Mobile Broadband ("eMBB"), Evolved Node B ("eNB"), Enhanced Subscriber Identification Module ("eSIM"), Equipment Identity Register ("EIR"), Evolved Packet Core ("EPC"), European Telecommunications Standards Institute ("ETSI"), E-UTRAN Radio Access Bearer ("E-RAB"), Evolved-Universal Terrestrial Radio Access Network ("E-UTRAN"), Frequency Division Duplex ("FDD"), Frequency Division Multiple Access ("FDMA"), Fully Qualified Domain Name ("FQDN"), 5G Node B ("gNB"), General Packet Radio Service ("GPRS"), Global System For Mobile Communications "GSM", Global System For Mobile Communications Association ("GSMA"), Hybrid Automatic Repeat Request ("HARQ"), Home Policy Control Function ("H-PCF"), Home Public Land Mobile Network ("HPLMN"), Home Subscriber Server ("HSS"), Identity or Identifier or Identification ("ID"), Information Element ("IE"), Integrity Key ("IK"), International Mobile Equipment Identity ("IMEI"), International Mobile Subscriber Identity ("IMSI"), Internet-of-Things ("IoT"), Key Derivation Function ("KDF"), Layer 2 ("L2"), Logical Channel Identifier ("LCID"), Logical Channel Prioritization ("LCP"), Long Term Evolution ("LTE"), Multiple Access ("MA"), Medium Access Control ("MAC"), Master Cell Group ("MCG"), Modulation Coding Scheme ("MCS"), Mobile Country Code ("MCC"), Mobile Network Code ("MNC"), Machine Type Communication ("MTC"), Master Information Block ("MIB"), Mobility Management ("MM"), Mobility Management Entity ("MME"), Non-Access Stratum ("NAS"), Narrowband ("NB"), Negative-Acknowledgment ("NACK") or ("NAK"), Network Entity ("NE"), Next Generation Node B ("gNB"), New Radio ("NR"), Operation and Maintenance Center ("OAM"), Open Mobile Alliance Device Management ("OMA DM"), Orthogonal Frequency Division Multiplexing ("OFDM"), Over-the-Air ("OTA"), Physical Broadcast Channel ("PBCH"), Policy Control Function ("PCF"), Packet Data Convergence Protocol ("PDCP"), Protocol Data Unit ("PDU"), Public Land Mobile Network ("PLMN"), Primary Synchronization Signal ("PSS"), Pointer ("PTR"), Quality of Service ("QoS"), Random Access Channel ("RACH"), Radio Access Technology ("RAT"), Resource Block ("RB"), Radio Link Control ("RLC"), Radio Link Failure ("RLF"), Radio Network Layer ("RNL"), Radio Resource Control ("RRC"), Radio Resource Management ("RRM"), Radio Access Network ("RAN"), Reference Signal Received Power ("RSRP"), Reference Signal Received Quality ("RSRQ"), Receive ("RX"), Secondary Cell Group ("SCG"), Secondary Synchronization Signal ("SSS"), Service Data Unit ("SDU"), Sequence Number ("SN"), Single Carrier Frequency Division Multiple Access ("SC-FDMA"), Subscriber Management Function ("SMF"), Signal-to-Noise Ratio ("SNR"), Subscriber Identity Module ("SIM"), System Information Block ("SIB"), Sidelink ("SL"), Shared Channel ("SCH"), Synchronization Signal ("SS"), Subscription Concealed Identifier ("SUCI"), Subscription Permanent Identifier ("SUPI"), Timing Advance Group ("TAG"), Tracking Area ("TA"), Time Division Duplex ("TDD"), Transport Network Layer ("TNL"), Transmission Time Interval ("TTI"), Transmit ("TX"), Unified Data Management ("UDM"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane Function ("UPF"), Ultra-Reliable Low-Latency Communication ("URLLC"), Universal Subscriber Identity Module ("USIM"), Universal Time Coordinated ("UTC"), Visited Policy Control Function ("V-PCF"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, there may be a rogue base station that imitates a real base station by faking being a real base station. In such networks, detecting the rogue base station may be difficult.

BRIEF SUMMARY

Methods for reporting monitored parameter information are disclosed. Apparatuses and systems also perform the functions of the apparatus. In one embodiment, the method includes receiving an indication to monitor parameters in an idle mode. In certain embodiments, the method includes monitoring the parameters in the idle mode. In various embodiments, the method includes transmitting a request to a first base station. In some embodiments, the method includes, in response to not receiving a correct response from the first base station: performing a cell reselection resulting in selection of a second base station; and transmitting a failure report to the second base station. In such embodiments, the failure report includes information corresponding to the parameters monitored in the idle mode.

In one embodiment, the indication to monitor parameters in the idle mode is received in response to a likelihood of a rogue base station being in an area. In a further embodiment, the parameters monitored in the idle mode include a time in the idle mode during communication with the first base station. In certain embodiments, the parameters monitored in the idle mode include a time taken to enter a connected mode during communication with the first base station. In various embodiments, the parameters monitored in the idle mode include a number of attempts to send a connected mode setup during communication with the first base station. In some embodiments, the method includes determining whether the number of attempts passes a predetermined threshold, and, in response to the number of attempts passing the predetermined threshold, determining that a correct response from the first base station is not received. In certain embodiments, the parameters monitored in the idle mode include a number of connection mode setup messages that fail due to timeout.

In various embodiments, the parameters monitored in the idle mode include a number of identity requests from the first base station requesting an international mobile subscriber identity. In some embodiments, the parameters monitored in the idle mode include a computed confidence level that the first base station is a rogue base station. In certain embodiments, the method includes ignoring broadcasted system information from the first base station during performing the cell reselection. In various embodiments, not receiving a correct response from the first base station includes determining a security key mismatch, a certificate failure, an authentication failure, and/or a connection setup failure.

An apparatus for reporting monitored parameter information, in one embodiment, includes a receiver that receives an indication to monitor parameters in an idle mode. In some embodiments, the apparatus includes a processor that monitors the parameters in the idle mode. In various embodiments, the apparatus includes a transmitter that transmits a request to a first base station. In certain embodiments, in response to not receiving a correct response from the first base station: the processor performs a cell reselection resulting in selection of a second base station; and the transmitter transmits a failure report to the second base station. In such embodiments, the failure report includes information corresponding to the parameters monitored in the idle mode.

A method for receiving monitored parameter information, in one embodiment, includes transmitting an indication to a remote unit for the remote unit to monitor parameters in an idle mode. In certain embodiments, the method includes receiving a failure report from the remote unit. In such embodiments, the failure report includes information corresponding to the parameters monitored in the idle mode. In various embodiments, the method includes identifying a rogue base station from the failure report. In some embodiments, the method includes transmitting an alarm identifying the rogue base station.

In one embodiment, the alarm includes an identifier of the rogue base station. In a further embodiment, the indication to monitor parameters in the idle mode is transmitted in response to a likelihood of the rogue base station being in an area used by the remote unit. In certain embodiments, the parameters monitored in the idle mode include a time in the idle mode during communication with the rogue base station. In various embodiments, the parameters monitored in the idle mode include a time taken to enter a connected mode during communication with the rogue base station. In some embodiments, the parameters monitored in the idle mode include a number of attempts to send a connected mode setup during communication with the rogue base station. In certain embodiments, the parameters monitored in the idle mode include a number of connection mode setup messages that fail due to timeout.

In various embodiments, the parameters monitored in the idle mode include a number of identity requests from the rogue base station requesting an international mobile subscriber identity of the remote unit. In some embodiments, the parameters monitored in the idle mode include a computed confidence level corresponding to the rogue base station.

An apparatus for receiving monitored parameter information, in one embodiment, includes a transmitter that transmits an indication to a remote unit for the remote unit to monitor parameters in an idle mode. In some embodiments, the apparatus includes a receiver that receives a failure report from the remote unit. In such embodiments, the failure report includes information corresponding to the parameters monitored in the idle mode. In various embodiments, the apparatus includes a processor that identifies a rogue base station from the failure report. In certain embodiments, the transmitter transmits an alarm identifying the rogue base station.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
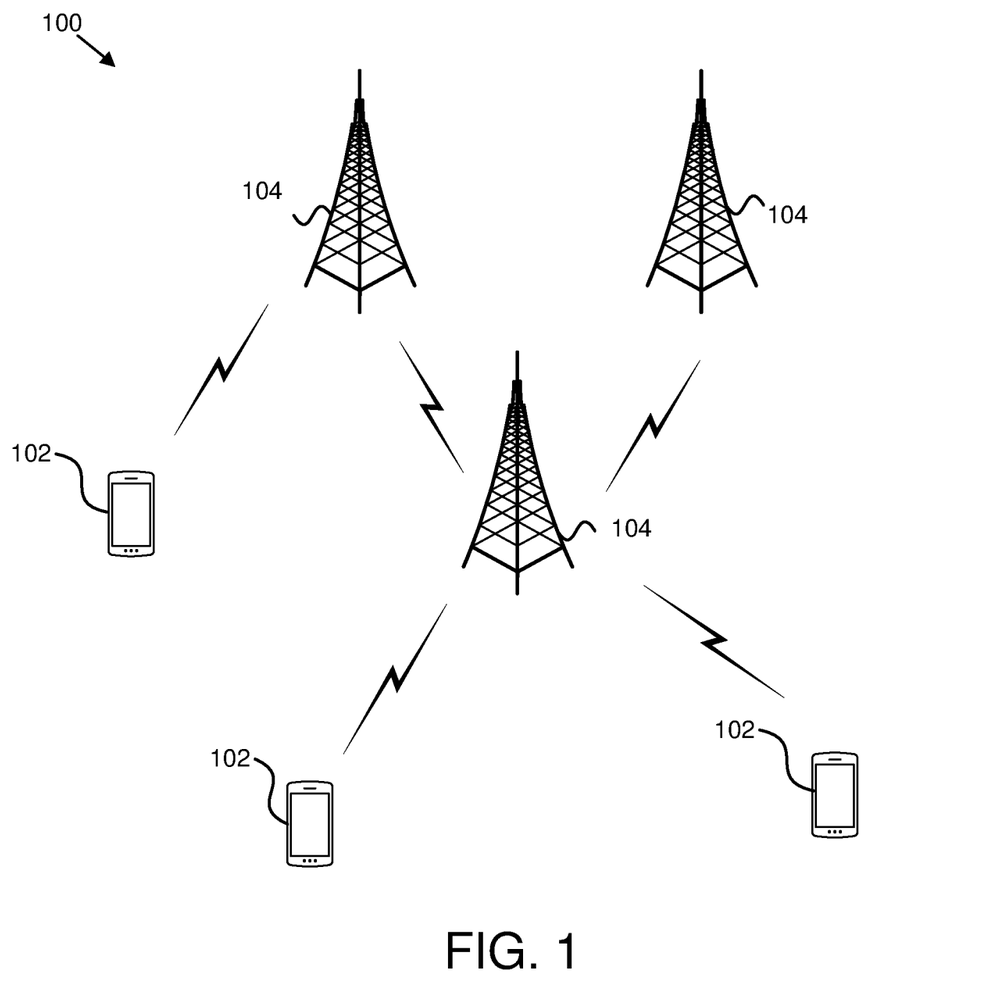
FIG. 1 is a schematic block diagram illustrating one embodiment of a wireless communication system for reporting and/or receiving monitored parameter information.

FIG. 1 depicts an embodiment of a wireless communication system 100 for reporting and/or receiving monitored parameter information. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base unit, a base station, a Node-B, an eNB, a gNB, a Home Node-B, a relay node, a device, a network device, an infrastructure device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components an eNB, a gNB, an AMF, a DB, an MME, a PCF, a UDR, a UPF, a serving gateway, and/or a UDM.

In one implementation, the wireless communication system 100 is compliant with the NR/5G protocols or LTE protocols specified by 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may be used to receive an indication to monitor parameters in an idle mode. In some embodiments, the remote unit 102 may be used to monitor the parameters in the idle mode. In various embodiments, the remote unit 102 may be used to transmit a request to a first base station. In some embodiments, the remote unit 102 may be used to, in response to not receiving a correct response from the first base station: perform a cell reselection resulting in selection of a second base station; and transmit a failure report to the second base station. In such embodiments, the failure report may include information corresponding to the parameters monitored in the idle mode. Accordingly, a remote unit 102 may be used for reporting monitored parameter information.

In certain embodiments, a network unit 104 may be used to transmit an indication to a remote unit 102 for the remote unit 102 to monitor parameters in an idle mode. In certain embodiments, the network unit 104 may be used to receive a failure report from the remote unit 102. In such embodiments, the failure report may include information corresponding to the parameters monitored in the idle mode. In various embodiments, the network unit 104 may be used to identify a rogue base station from the failure report. In some embodiments, the network unit 104 may be used to transmit an alarm identifying the rogue base station. Accordingly, a network unit 104 may be used for receiving monitored parameter information.

Figure 2:
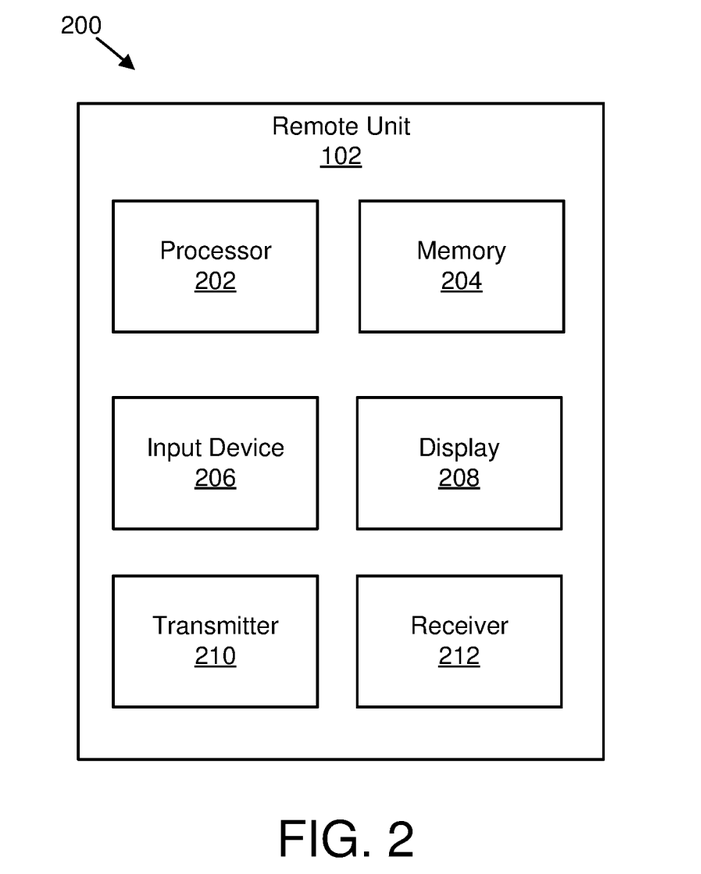
FIG. 2 is a schematic block diagram illustrating one embodiment of an apparatus that may be used for reporting monitored parameter information.

FIG. 2 depicts one embodiment of an apparatus 200 that may be used for reporting monitored parameter information. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may monitor parameters in an idle mode. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In some embodiments, the receiver 212 may receive an indication to monitor parameters in an idle mode. In certain embodiments, the transmitter 210 may transmit a request to a first base station. In certain embodiments, in response to not receiving a correct response from the first base station: the processor 202 may perform a cell reselection resulting in selection of a second base station; and the transmitter 210 may transmit a failure report to the second base station. In such embodiments, the failure report may include information corresponding to the parameters monitored in the idle mode. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
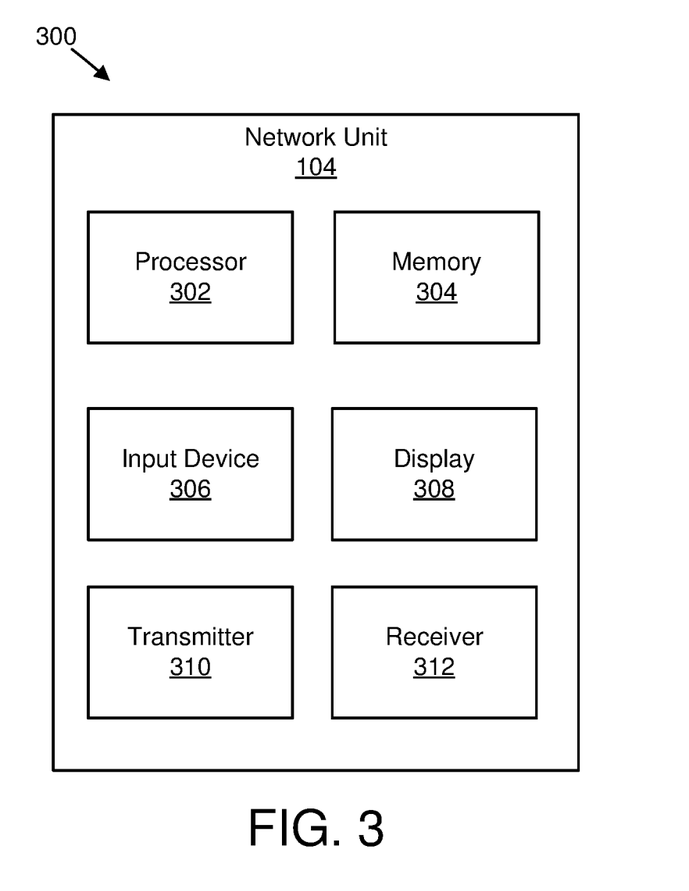
FIG. 3 is a schematic block diagram illustrating one embodiment of an apparatus that may be used for receiving monitored parameter information.

FIG. 3 depicts one embodiment of an apparatus 300 that may be used for receiving monitored parameter information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 may transmit an indication to a remote unit 102 for the remote unit 102 to monitor parameters in an idle mode. In some embodiments, the receiver 312 may receive a failure report from the remote unit 102. In such embodiments, the failure report may include information corresponding to the parameters monitored in the idle mode. In various embodiments, the processor 302 may identify a rogue base station from the failure report. In certain embodiments, the transmitter 310 may transmit an alarm identifying the rogue base station. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
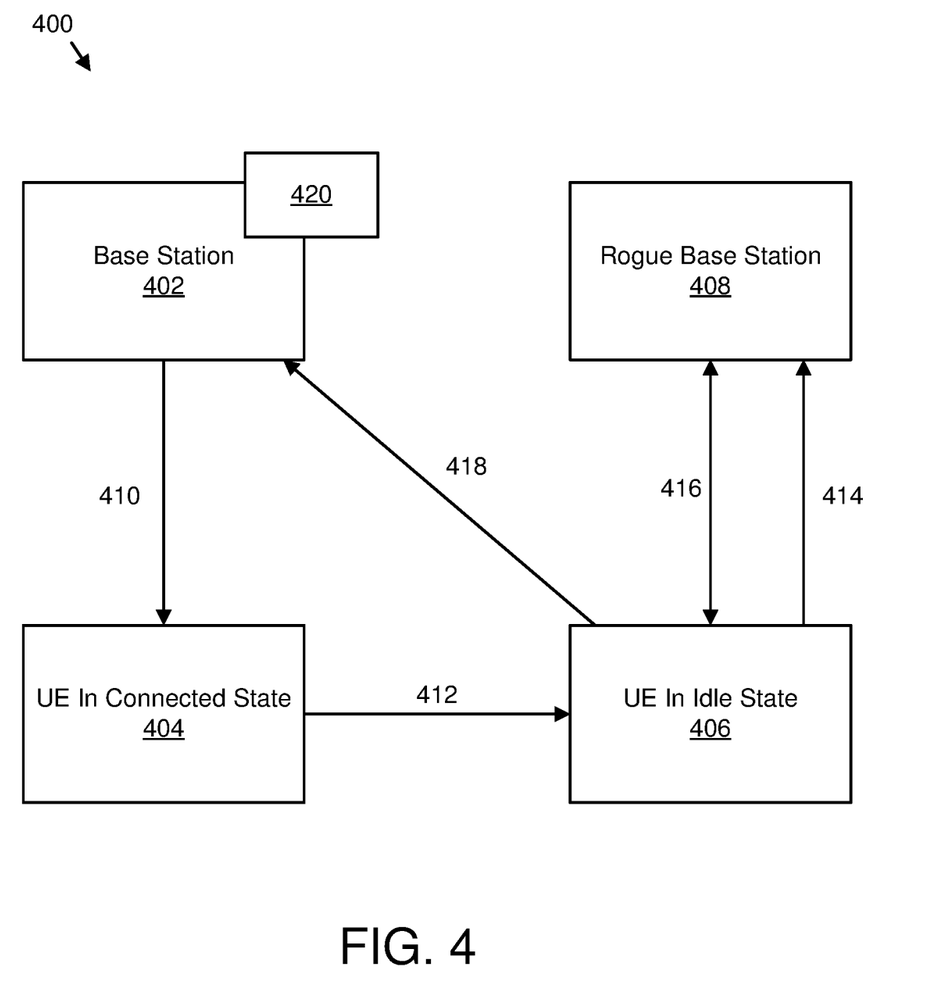
FIG. 4 is a schematic block diagram illustrating one embodiment of a system for reporting and receiving monitored parameter information.

FIG. 4 is a schematic block diagram illustrating one embodiment of a system 400 for reporting and receiving monitored parameter information. The system 400 includes a base station 402, a UE in a connected state 404 (e.g., RRC CONNECTED mode), a UE in an idle state 406 (e.g., RRC IDLE mode), and a rogue base station 408. As used herein, the base station 402 may be substantially the same as the network unit 104 and the UEs 404 and 406 may be substantially the same as the remote unit 102.

In some embodiments, a remote unit 102 may desire to send a service request for mobile originated data during a time in which the remote unit 102 is communicating with a fake base station (e.g., a rogue base station). In such embodiments, the service request may fail at the remote unit 102 because an authentication vector may not authenticate the fake base station and/or a connection setup (e.g., RRC connection setup) may fail (e.g., due to a timeout).

In certain embodiments, the remote unit 102 may collect relevant information in a VarConnEstFailReport at a time of a connection setup timeout (e.g., such information may include plmn-Identity, failedCellId, measResultFailedCell, measResultNeighCells, locationInfo, and so forth). In some embodiments, a fake base station may broadcast a very high connEstFailCount value. Accordingly, a number of times that the remote unit 102 detects a connection setup timer expiring on a same cell before applying connEstFailOffset may be high. In various embodiments, because connection setup timer may be in a timeframe of approximately 2 seconds, a remote unit 102 may keep trying connection requests for up to the timer timeframe of approximately 2 seconds. In such embodiments, the remote unit 102 may record and/or report a value for connEstFailCount that is higher than 4. In some embodiments, a failure report may be deleted by a remote unit 102 at any time.

In various embodiments, in response to a fake base station may not send response messages (e.g., NAS response messages). Accordingly, in such embodiments, a remote unit 102 may detect (e.g., based on an AUTN parameter) that the base station is fake. In certain embodiments, the only response message (e.g., NAS message) a fake base station may send is an identity request that requests an IMSI from the remote unit 102. In some embodiments, the remote unit 102 may record whether it is asked to send the IMSI in circumstances in which a connection (e.g., RRC Connection) has timed out.

In various embodiments, a remote unit 102 may perform a cell reselection in response to detecting a fake base station and/or may send a measurement report and/or a failure report with a cause value to a new base station (e.g., genuine base station, not fake base station) using a VarConnEstFailReport format. In such embodiments, the remote unit 102 may add information in addition that includes a connEstFailCount, whether IMSI was requested, and/or other information.

In certain embodiments, a genuine base station may identify a fake base station based on information in a failure report from a remote unit 102 and/or may support an operator (e.g., especially in circumstances in which a fake base station is moving to different locations over time).

In various embodiments, a genuine base station may configure an extended failure report to be recorded in a remote unit 102 during a time in which the remote unit 102 is in a connected mode and/or in an idle mode. In embodiments in which a remote unit 102 is instructed to perform extended failure reporting, the remote unit 102 may not delete the failure report and/or may store the failure report in a secure and/or permanent manner so that the failure report is not deleted (e.g., not deleted in response to a user changing the battery) until the failure report is submitted to a genuine base station. As may be appreciated, extended failure reporting may be reporting that includes more information than standard failure reporting.

In one embodiment, a first communication 410 is transmitted from the base station 402 to the UE in the connected state 404. In various embodiments, the first communication 410 includes one or more messages having instructions from the base station 402 for the UE in the connected state 404 to perform measurements (e.g., monitor parameters) in an idle mode (e.g., RRC IDLE mode) and/or to log the measurements (e.g., log measurements corresponding to monitored parameters). In some embodiments, the UE in the connected state 404 may be configured for extended failure reporting. In such embodiments, the base station 402 may add a parameter with extFailureReporting=True in the request.

In various embodiments, the UE in the connected state 404 may transition 412 to the UE in the idle state 406 and perform measurements as instructed. The UE in the idle state 406 may move around and perform cell reselection with a cell having the best signal.

In certain embodiments, while performing cell reselection, in a second communication 414, the UE in the idle state 406 may transmit one or more messages to the rogue base station 408. Moreover, the UE in the idles state 406 may be unaware that it is camping at a fake base station.

In some embodiments, a third communication 416 is transmitted between the UE in the idle state 406 and the rogue base station 408. In such embodiments, the third communication 416 may include one or more messages. While transmitting and/or receiving the third communication 416, the UE in the idle state 406 may recognize (e.g., determine) that it is communicating with a fake base station. In various embodiments, the UE in the idle state 406 may send a service request as part of the third communication 416 to perform a mobile oriented session setup. Moreover, as part of the third communication 416, the rogue base station 408 may attempt to keep a connection (e.g., RRC connection) alive; however, the UE in the idle state 406 may not be able to authenticate the rogue base station 408 with a fake authentication vector provided from the rogue base station 408 to the UE in the idle state 406 and/or the connection setup (e.g., RRC connection setup) may time out. In certain embodiments, as part of the third communication 416, the rogue base station 408 may request that the UE in the idle state 406 send its IMSI to the rogue base station 408. In some embodiments, in response to the UE in the idle state 406 being configured for extended failure reporting, the UE in the idle state 406 may record a number of connection setup time outs and/or whether an IMSI was requested in addition to normal failure reporting that occurs as a result of a connection setup timeout.

In various embodiments, a fourth communication 418 is transmitted from the UE in the idle state 406 to the base station 402. In such embodiments, the fourth communication 418 may include one or more messages. As may be appreciated, based on information recorded by the UE in the idle state 406, the UE in the idle state 406 may determine that the currently attached base station (e.g., the rogue base station 408) is believed to be a fake base station. Accordingly, the UE in the idle state 406 may performs cell reselection as part of the fourth communication 418 to select a next best signal. In some embodiments, the UE in the idle state 406 may measure a time that it has camped at the rogue base station 408 in the idle mode and/or a time it has spent trying to get into a connected state. In certain embodiments, the UE in the idle state 406 may compute (e.g., determine) a confidence level corresponding to the rogue base station 408 (e.g., how confident the UE in the idle state 406 is that the rogue base station 408 to which the UE in the idle state 406 is attached is actually a fake base station—the confidence level may be based on the an idle mode time, a connected mode time, a number of failed connection setups, a broadcasted connection retry count, whether IMSI was requested while being in the same PLMN, and so forth). In various embodiments, with a high enough confidence level, the UE in the idle state 406 may ignore broadcast information transmitted from the rogue base station 408 during a time in which the UE in the idle state 406 performs cell reselection. In some embodiments, as part of the fourth communication 418, the UE in the idle state 406 may transmit a failure report and, in response to being instructed to perform extended failure reporting, information that includes connection setup failure counts, an IMSI requested flag that indicates IMSI has been requested, a number of IMSI requests, a length of time in an idle mode, and/or a length of time spent trying to get in a connected mode. In certain embodiments, portions of the failure report and/or portions of the extended failure report may be transmitted from the UE in the idle state 406 in a service request NAS message to a control plane entity (e.g., MME, AMF, etc.). In various embodiments, the UE in the idle state 406 may include its calculated confidence level about the rogue base station 408 in the failure report.

In certain embodiments, the base station 402 may detect 420 that the rogue base station 408 is a fake base station and/or may start an alarm in an OAM system of an operator. Moreover, the base station 402 (e.g., genuine base station) may immediate change the SIB and include an ID corresponding to the rogue base station 408 in a black list for camping. As may be appreciated, the rogue base station 408 may change its cell ID frequently; however, including the ID corresponding to the rogue base station 408 in a black list for camping may inhibit another UE from camping on the rogue base station 408 before the rogue base station 408 changes its cell id.

Figure 5:
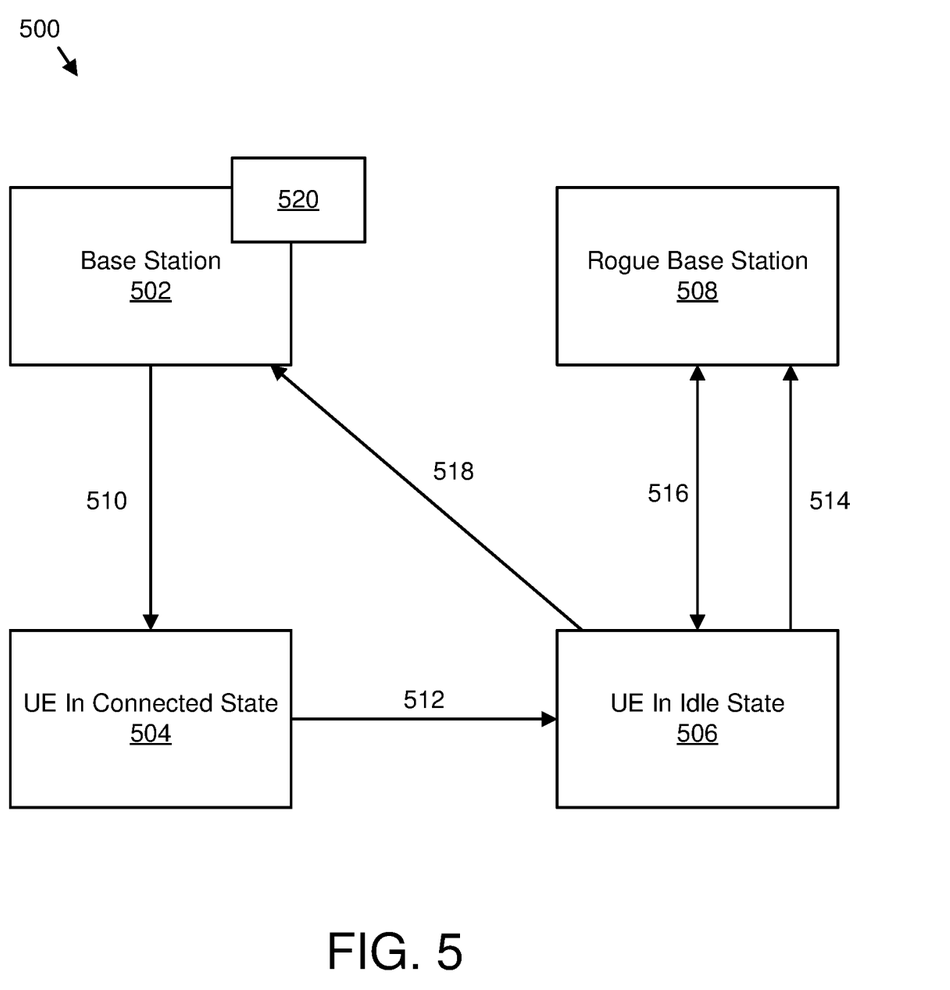
FIG. 5 is a schematic block diagram illustrating another embodiment of a system for reporting and receiving monitored parameter information.

FIG. 5 is a schematic block diagram illustrating another embodiment of a system 500 for reporting and receiving monitored parameter information. The system 500 includes a base station 502, a UE in a connected state 504 (e.g., RRC CONNECTED mode), a UE in an idle state 506 (e.g., RRC IDLE mode), and a rogue base station 508. As used herein, the base station 502 may be substantially the same as the network unit 104 and the UEs 504 and 506 may be substantially the same as the remote unit 102.

In certain embodiments, a remote unit 102 may become aware of a fake base station in a variety of different ways. For example, a remote unit 102 may become aware of a fake base station by detecting invalid certificates, using UL monitoring, by checking signed system information in any SIBS, by monitoring connection setup, by monitoring connection failures, and so forth.

In one embodiment, a first communication 510 is transmitted from the base station 502 to the UE in the connected state 504. In various embodiments, the first communication 510 includes one or more messages having instructions from the base station 502 for the UE in the connected state 504 to perform measurements (e.g., monitor parameters) in an idle mode (e.g., RRC IDLE mode) and/or to log the measurements (e.g., log measurements corresponding to monitored parameters). In some embodiments, the UE in the connected state 504 may be configured for extended failure reporting. In such embodiments, the base station 502 may add a parameter with extFailureReporting=True in the request.

In various embodiments, the UE in the connected state 504 may transition 512 to the UE in the idle state 506 and perform measurements as instructed. The UE in the idle state 506 may move around and perform cell reselection with a cell having the best signal.

In certain embodiments, while performing cell reselection, in a second communication 514, the UE in the idle state 506 may transmit one or more messages to the rogue base station 508. Moreover, the UE in the idles state 506 may be unaware that it is camping at a fake base station.

In some embodiments, a third communication 516 is transmitted between the UE in the idle state 506 and the rogue base station 508. In such embodiments, the third communication 516 may include one or more messages. While transmitting and/or receiving the third communication 516, the UE in the idle state 506 may recognize (e.g., determine) that it is communicating with a fake base station. In various embodiments, the UE in the idle state 506 may transmit messages similar to the third communication 416 described in relation to FIG. 4. In certain embodiments, the UE in the idle state 506 may recognize through its monitoring that it is communicating with a fake base station using any suitable detection method, such as information in the third communication 516 indicating wrong signed system information, a failed authentication, wrong certificates, a failed connection setup, or any other information.

In various embodiments, a fourth communication 518 is transmitted from the UE in the idle state 506 to the base station 502. In such embodiments, the fourth communication 518 may include one or more messages. As may be appreciated, based on information recorded by the UE in the idle state 506, the UE in the idle state 506 may determine that the currently attached base station (e.g., the rogue base station 508) is believed to be a fake base station. Accordingly, the UE in the idle state 506 may performs cell reselection as part of the fourth communication 518 to select a next best signal. In some embodiments, the UE in the idle state 506 may, if instructed, creates an extended failure report that includes a cause value pointing to the reason: certificate failure, wrong signature, authentication failure, connection failure, connection setup failure counts, an IMSI requested flag that indicates IMSI has been requested, a number of IMSI requests, a length of time in an idle mode, a length of time spent trying to get in a connected mode, and/or a computed confidence level that the rogue base station 508 is a fake base station.

In some embodiments, the UE in the idle state 506 may perform cell reselection with a next best signal and/or try to perform a connection setup. In such embodiments, the UE in the idle state 506 may ignore broadcast system information from the rogue base station 508. In certain embodiments, portions of the failure report and/or portions of the extended failure report may be transmitted from the UE in the idle state 506 in a service request NAS message to a control plane entity (e.g., MME, AMF, etc.).

In certain embodiments, the base station 502 may detect 520 that the rogue base station 508 is a fake base station and/or may start an alarm in an OAM system of an operator. Moreover, the base station 502 (e.g., genuine base station) may immediate change the SIB and include an ID corresponding to the rogue base station 508 in a black list for camping. As may be appreciated, the rogue base station 508 may change its cell ID frequently; however, including the ID corresponding to the rogue base station 508 in a black list for camping may inhibit another UE from camping on the rogue base station 508 before the rogue base station 508 changes its cell id.

Figure 6:
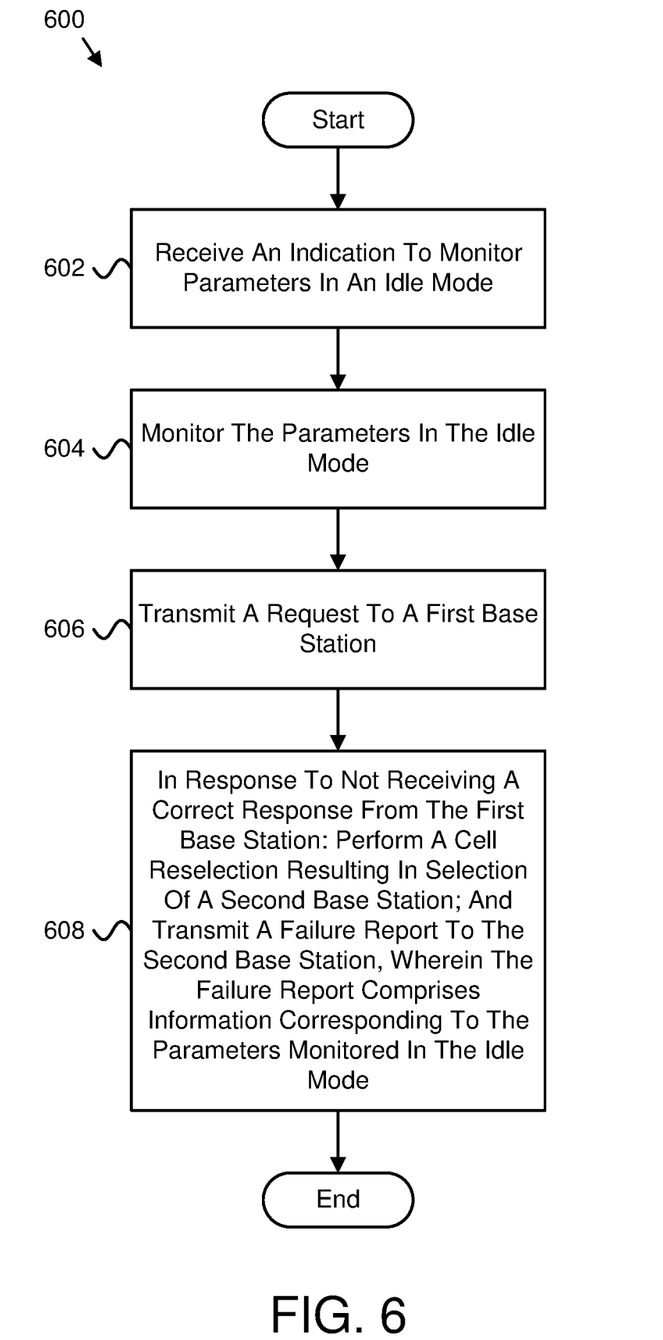
FIG. 6 is a schematic flow chart diagram illustrating one embodiment of a method for reporting monitored parameter information.

FIG. 6 is a schematic flow chart diagram illustrating one embodiment of a method 600 for reporting monitored parameter information. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602 an indication to monitor parameters in an idle mode. In certain embodiments, the method 600 includes monitoring 604 the parameters in the idle mode. In various embodiments, the method 600 includes transmitting 606 a request to a first base station. In some embodiments, the method 600 includes, in response to not receiving a correct response from the first base station: performing 608 a cell reselection resulting in selection of a second base station; and transmitting a failure report to the second base station. In such embodiments, the failure report includes information corresponding to the parameters monitored in the idle mode.

In one embodiment, the indication to monitor parameters in the idle mode is received in response to a likelihood of a rogue base station being in an area. In a further embodiment, the parameters monitored in the idle mode include a time in the idle mode during communication with the first base station. In certain embodiments, the parameters monitored in the idle mode include a time taken to enter a connected mode during communication with the first base station. In various embodiments, the parameters monitored in the idle mode include a number of attempts to send a connected mode setup during communication with the first base station. In some embodiments, the method 600 includes determining whether the number of attempts passes a predetermined threshold, and, in response to the number of attempts passing the predetermined threshold, determining that a correct response from the first base station is not received. In certain embodiments, the parameters monitored in the idle mode include a number of connection mode setup messages that fail due to timeout.

In various embodiments, the parameters monitored in the idle mode include a number of identity requests from the first base station requesting an international mobile subscriber identity. In some embodiments, the parameters monitored in the idle mode include a computed confidence level that the first base station is a rogue base station. In certain embodiments, the method 600 includes ignoring broadcasted system information from the first base station during performing the cell reselection. In various embodiments, not receiving a correct response from the first base station includes determining a security key mismatch, a certificate failure, an authentication failure, and/or a connection setup failure.

Figure 7:
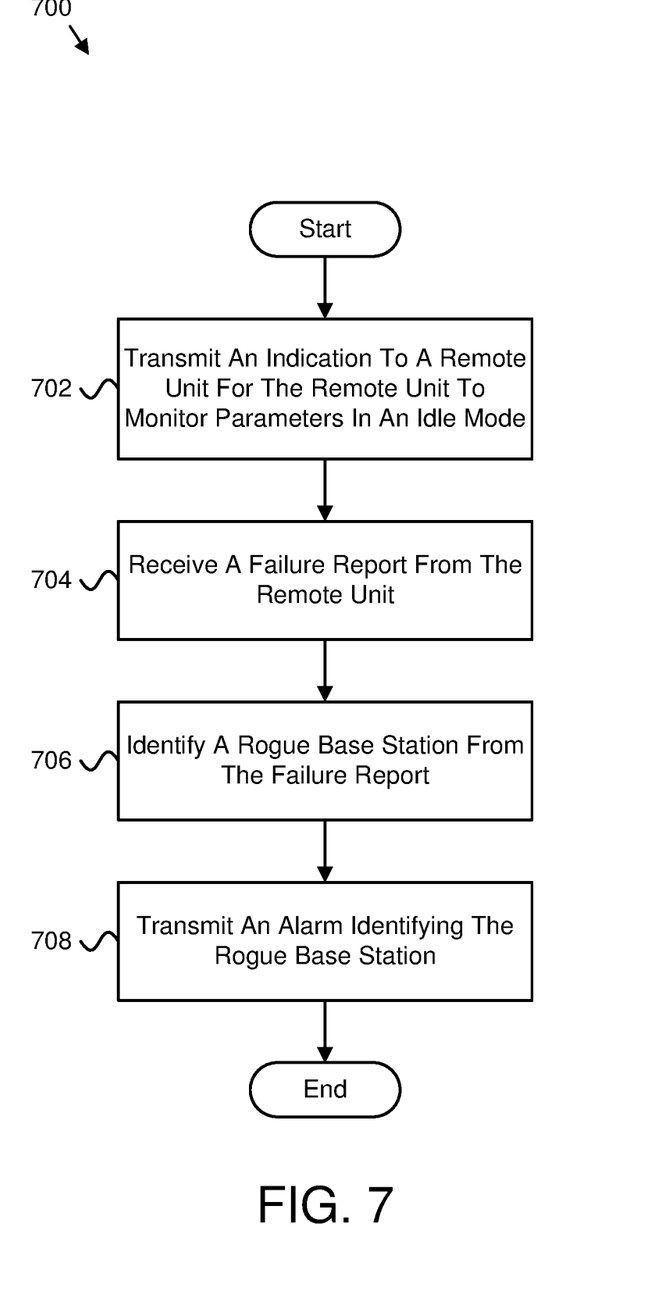
FIG. 7 is a schematic flow chart diagram illustrating one embodiment of a method for receiving monitored parameter information.

FIG. 7 is a schematic flow chart diagram illustrating one embodiment of a method 700 for receiving monitored parameter information. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

The method 700 may include transmitting 702 an indication to a remote unit 102 for the remote unit 102 to monitor parameters in an idle mode. In certain embodiments, the method 700 includes receiving 704 a failure report from the remote unit 102. In such embodiments, the failure report includes information corresponding to the parameters monitored in the idle mode. In various embodiments, the method 700 includes identifying 706 a rogue base station from the failure report. In some embodiments, the method 700 includes transmitting 708 an alarm identifying the rogue base station.

In one embodiment, the alarm includes an identifier of the rogue base station. In a further embodiment, the indication to monitor parameters in the idle mode is transmitted in response to a likelihood of the rogue base station being in an area used by the remote unit 102. In certain embodiments, the parameters monitored in the idle mode include a time in the idle mode during communication with the rogue base station. In various embodiments, the parameters monitored in the idle mode include a time taken to enter a connected mode during communication with the rogue base station. In some embodiments, the parameters monitored in the idle mode include a number of attempts to send a connected mode setup during communication with the rogue base station. In certain embodiments, the parameters monitored in the idle mode include a number of connection mode setup messages that fail due to timeout.

In various embodiments, the parameters monitored in the idle mode include a number of identity requests from the rogue base station requesting an international mobile subscriber identity of the remote unit 102. In some embodiments, the parameters monitored in the idle mode include a computed confidence level corresponding to the rogue base station.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
  receiving, while in a connected mode, an indication to monitor parameters of failures during a connection establishment from an idle mode;
  in response to receiving the indication to monitor parameters, transitioning from the connected mode to the idle mode;
  monitoring the parameters in the idle mode;
  transmitting a request to a first cellular network base station to establish a connection; and
  in response to not receiving a correct response to establish the connection from the first cellular network base station:
    performing a cell reselection resulting in selection of a second cellular network base station; and
    transmitting, from a remote unit, a failure report to the second cellular network base station, wherein the failure report comprises the parameters gathered during the connection establishment failure with the first cellular network base station and the parameters gathered in the idle mode.

2. The method of claim 1, wherein the indication to monitor parameters in the idle mode is received in response to a likelihood of a rogue cellular network base station being in an area.

3. The method of claim 1, wherein the parameters monitored in the idle mode comprise a time in the idle mode during communication with the first cellular network base station.

4. The method of claim 1, wherein the parameters monitored in the idle mode comprise a time taken to enter a connected mode during communication with the first cellular network base station.

5. The method of claim 1, wherein the parameters monitored in the idle mode comprise a number of attempts to send a connected mode setup during communication with the first cellular network base station.

6. The method of claim 5, further comprising determining whether the number of attempts passes a predetermined threshold, and, in response to the number of attempts passing the predetermined threshold, determining that a correct response from the first cellular network base station is not received.

7. The method of claim 1, wherein the parameters monitored in the idle mode comprise a number of connection mode setup messages that fail due to timeout.

8. The method of claim 1, wherein the parameters monitored in the idle mode comprise a number of identity requests from the first cellular network base station requesting an international mobile subscriber identity.

9. The method of claim 1, wherein the parameters monitored in the idle mode comprise a computed confidence level that the first cellular network base station is a rogue cellular network base station.

10. The method of claim 1, further comprising ignoring broadcasted system information from the first cellular network base station during performing the cell reselection.

11. The method of claim 1, wherein not receiving a correct response from the first cellular network base station comprises determining a security key mismatch, a certificate failure, an authentication failure, a connection setup failure, or some combination thereof.

12. An apparatus comprising:
a receiver that receives, while in a connected mode, an indication to monitor parameters of failures during a connection establishment from an idle mode;
a processor that:
in response to receiving the indication to monitor parameters, transitions from the connected mode to the idle mode; and
monitors the parameters in the idle mode; and
a transmitter that transmits a request to a first cellular network base station to establish a connection, wherein, in response to not receiving a correct response to establish the connection from the first cellular network base station:
the processor performs a cell reselection resulting in selection of a second cellular network base station; and
the transmitter transmits a failure report to the second cellular network base station, wherein the failure report comprises the parameters gathered during the connection establishment failure with the first cellular network base station and the parameters gathered in the idle mode.

13. The apparatus of claim 12, wherein the indication to monitor parameters in the idle mode is received in response to a likelihood of a rogue cellular network base station being in an area.

14. An apparatus comprising:
a transmitter that transmits an indication to a remote unit in a connected mode for the remote unit to monitor parameters of failures during a connection establishment from an idle mode, wherein the remote unit, in response to receiving the indication to monitor parameters, transitions from the connected mode to the idle mode and monitors the parameters in the idle mode;
a receiver that receives a failure report from the remote unit, wherein the failure report comprises the parameters gathered during a connection establishment failure with a cellular network base station and the parameters gathered in the idle mode; and
a processor that identifies a rogue cellular network base station from the failure report, wherein the transmitter transmits an alarm identifying the rogue cellular network base station.

15. The apparatus of claim 14, wherein the alarm comprises an identifier of the rogue cellular network base station.

16. The apparatus of claim 14, wherein the indication to monitor parameters in the idle mode is transmitted in response to a likelihood of the rogue cellular network base station being in an area used by the remote unit.

17. The apparatus of claim 14, wherein the parameters monitored in the idle mode comprise a number of attempts to send a connected mode setup during communication with the rogue cellular network base station.

18. The apparatus of claim 14, wherein the parameters monitored in the idle mode comprise a number of connection mode setup messages that fail due to timeout.

19. The apparatus of claim 14, wherein the parameters monitored in the idle mode comprise a number of identity requests from the rogue cellular network base station requesting an international mobile subscriber identity of the remote unit.

20. The apparatus of claim 14, wherein the parameters monitored in the idle mode comprise a computed confidence level corresponding to the rogue cellular network base station.

* * * * *